Oct. 25, 1938.  F. SELLS  2,134,239
SEED SAVING ATTACHMENT FOR MOWING MACHINES
Filed Aug. 9, 1937 4 Sheets-Sheet 1

Inventor
Floyd Sells
By Clarence A. O'Brien
Hyman Berman
Attorneys

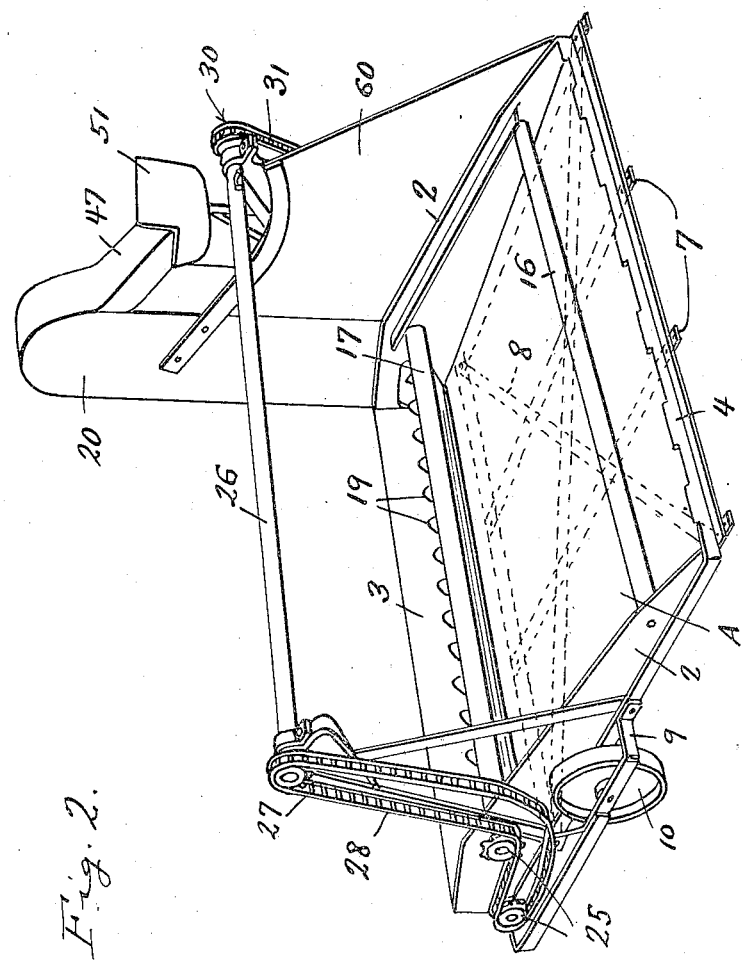

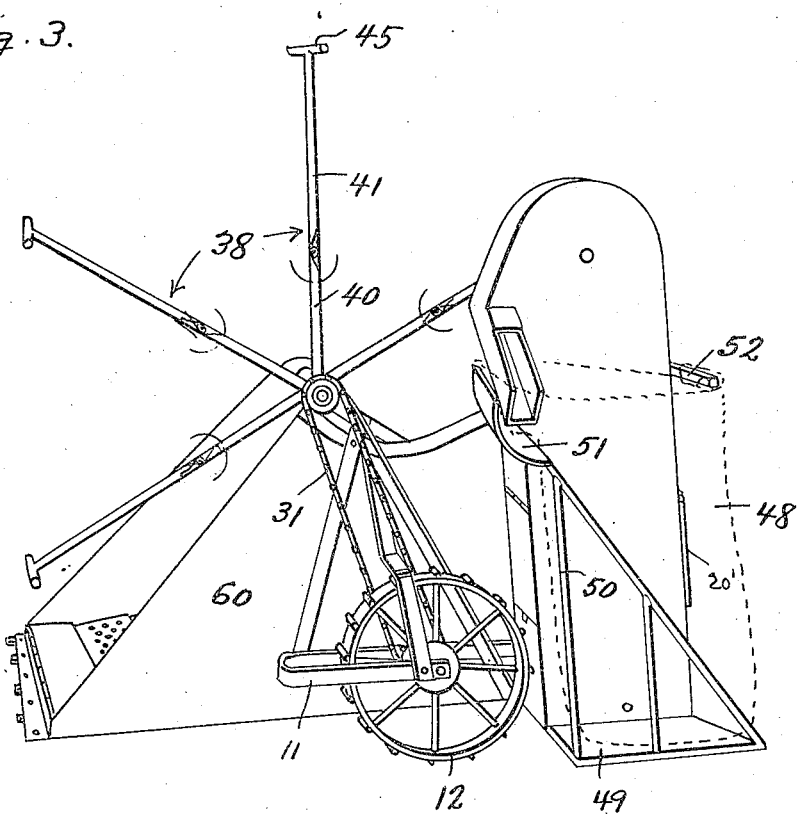
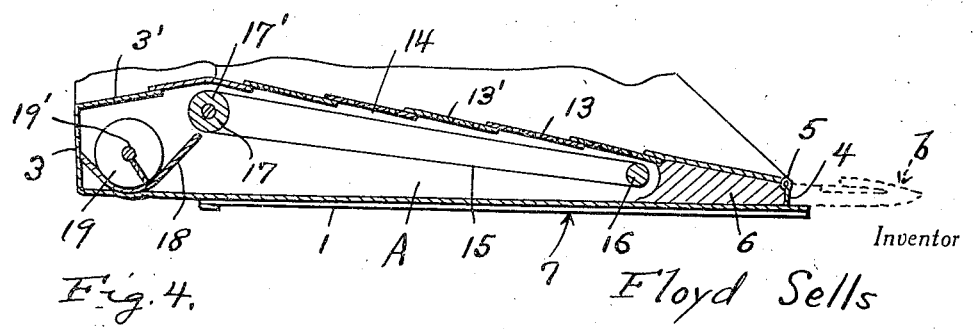

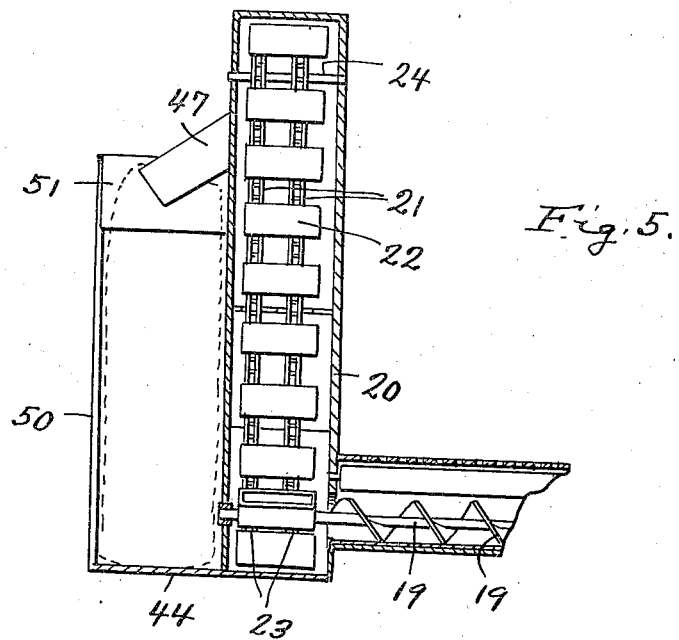
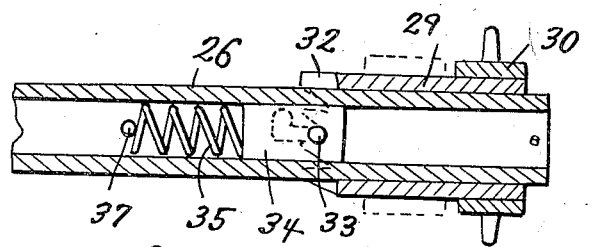
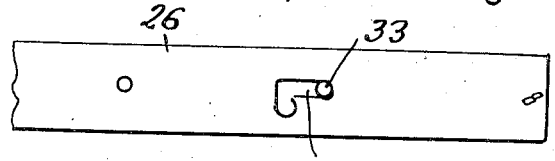
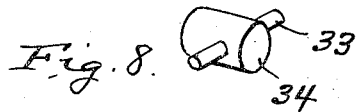

Patented Oct. 25, 1938

2,134,239

UNITED STATES PATENT OFFICE 2,134,239

SEED SAVING ATTACHMENT FOR MOWING MACHINES

Floyd Sells, Monroe, N. C.

Application August 9, 1937, Serial No. 158,223

2 Claims. (Cl. 56—220)

This invention relates to a seed saving attachment for a mowing machine, the general object of the invention being to provide means for catching the seeds from lespedeza and other grass or the like, while it is being cut, with means for carrying the seed to a point where the seed will be delivered into sacks.

Another object of the invention is to so form the parts that the device can be readily attached to the cutter bar of a mowing machine so that it will move along with the machine and to operate the moving parts of the device from one of the ground wheels which act to help support the device.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a perspective view of the invention with parts removed.

Figure 3 is a view looking toward that end of the machine which is located adjacent an end or side of the mowing machine when the device is attached to the mowing machine.

Figure 4 is a vertical sectional view through the lower part of the machine.

Figure 5 is a fragmentary elevation with parts in section to show the elevator and the conveyor and the sacking means.

Figure 6 is a longitudinal sectional view showing the clutch means for the reel shaft.

Figure 7 is a fragmentary elevation of the parts shown in Figure 6.

Figure 8 is a detail view of the movable clutch member.

Figure 1:
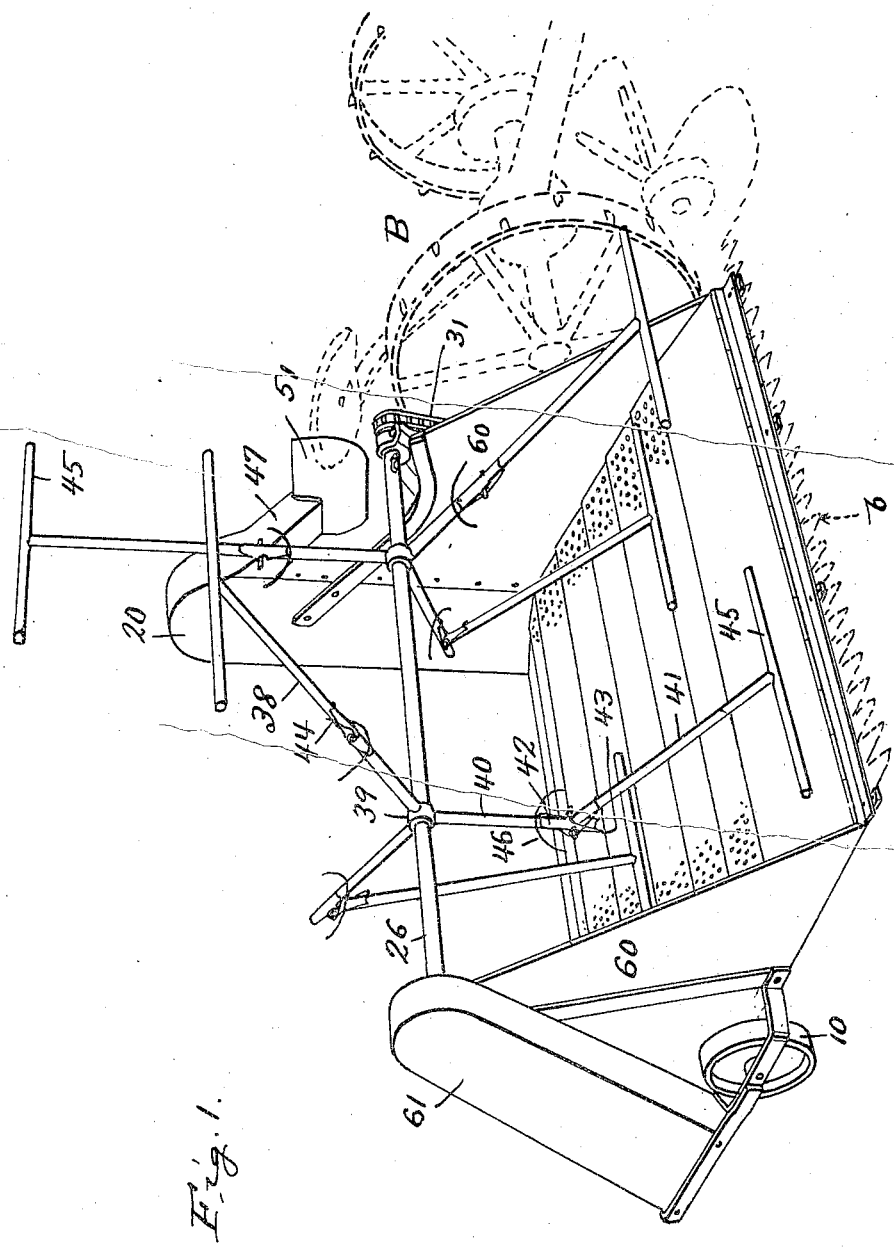
Figure 1 is a perspective view of the device showing the same attached to a mowing machine, the mowing machine being shown in dotted lines.

In these drawings, the letter A indicates the pan-like base of the invention, the pan including the bottom part 1, the side part 2 and the rear wall 3. A short front wall 4 is provided for the pan and its upper edge is formed with the hinged barrels 5. The side walls slope downwardly and forwardly to the front of the pan and a cross piece 6, preferably of wood, extends across the front of the pan and is suitably fastened in place, the top of the piece 6 sloping upwardly and rearwardly from the front wall 4, as shown more particularly in Figure 4. A plurality of strips 7 is fastened to the bottom face of the pan and extend parallel to the sides thereof and have their front ends projecting beyond the front wall 6 and these ends are perforated to receive bolts or the like which act to fasten the front of the pan to the cutter bar b of a mowing machine B, as shown in Figure 1. The bottom of the pan is also provided with reinforcing bars 8 which are connected with the bars 7 and with parts of the pan, if desired. A frame 9 is attached to the outer side of the pan and supports the ground wheel 10 and a frame 11 is connected to the inner side of the device and supports the wheel 12 which is provided with cleats on its rim so that it will not slip as this wheel is used to drive the movable parts of the invention.

A cover member 13 is hinged to the front 4 of the pan by a hinge pin passing through the barrels 5 and corresponding barrels on the front edge of the cover member and the rear part of this cover member rests on an inwardly extending part 3' of the rear wall 3, when the cover member is in position closing the pan. This cover member is composed of a plurality of transversely extending strips 13' which overlap each other with the rear edge of one strip overlapping the front edge of the next rearwardly strip, as shown in Figure 4 so that shoulders are formed for preventing the seeds from rolling down the cover member. As will be seen the cover member slopes upwardly and rearwardly and all the parts thereof excepting the front and rear strips are provided with numerous perforations 14 for the passage of the seed.

The seeds passing through the perforations of the cover member will fall upon an endless conveyor belt 15 which passes over a roller 16 immediately in rear of the cross piece 6 and it also passes over a roller 17 adjacent the rear end of the pan and this conveyor will convey the seeds into a trough 18 extending transversely through the rear part of the pan. A spiral conveyor 19 is located in the trough and passes through an opening in the inner side 2 into the bottom part of a vertically arranged elevator casing 20 which contains the elevator composed of the endless members 21 and the buckets 22. The shaft 19' of the conveyor 19 extends across the lower part of the elevator casing and has the sprockets 23 thereon, as shown in dotted lines in Figure 5, for the endless members 21 of the elevator. Other sprockets are carried by the shaft 24 at the upper end of the elevator casing and the chains or endless members 21 pass over these sprockets. The shaft 19' and the shaft 17', on which the roller 17 is mounted, extends through the outer side wall 2 and each extended end has a sprocket 25 thereon.

A shaft 26 is journaled in upward extending parts of the frames 9 and 11 and the outer end of the shaft has a sprocket 27 thereon and a chain 28 passes over this sprocket 27 and the sprockets 25 so that the conveyor 15 and the spiral conveyor 19 are actuated from this shaft 26. The inner end of the shaft 26 extends through a sleeve 29 which is rotatably arranged on said shaft 26 and a sprocket 30 is connected to the sleeve and a chain 31 passes over this sprocket 30 and over a sprocket connected with the wheel 12 so that the shaft 26 is driven from said wheel 12. The sleeve 29 is detachably connected with the shaft 26 by a coupling which includes the teeth 32 on the inner end of the sleeve, a pin 33 carried by a plug 34 slidably arranged in the shaft 26 and the spring 35 for normally pressing the plug to a position where the pin 33 will engage the teeth 32. The pin 33 passes through a pair of L-shaped slots 36 in the shaft 26 and the spring bears against a stop pin 37 which passes through the shaft 26. Thus with the parts in the position shown in Figures 6 and 7 the clutch is engaged and the shaft will be driven from the sleeve 29 and the sprocket 30 but by moving the pin 33 into the transverse parts of the slots 36 the pin will be disengaged from the sleeve and thus the shaft 26 will not be driven by the wheel 12 and thus all the movable parts of the invention will remain at rest even though the mowing machine with the invention attached thereto is traveling along. The clutch can be moved to either one of the two positions by simply grasping the ends of the pin 33 with the fingers and moving the plug 34 either in one direction or the other.

A plurality of T-shaped arms 38 having their shanks connected with hubs 39 fastened to the shaft 26 and each arm has its shank composed of the inner and outer sections 40 and 41 which are pivotally connected together at their adjacent ends and a sleeve 42 encircles the outer end of the section 40 and has a substantially semicircular part 43 which partly fits around the inner end of the section 41 so that said section 41 can move rearwardly on its pivot but cannot move forwardly. A spring 44 acts to hold the section 41 in straight extended position on the section 40. These parts are so arranged that as the arms move downwardly the heads 45 will strike the front part of the cover member, under which the cross piece 6 is located, and this will cause the sections to break at the joint and then as each section 40 moves rearwardly it will pull the outer section rearwardly over the cover member and thus the head 45 will pull the grass cut by the mower rearwardly over the perforated cover member and the seeds dropping from the grass will pass through the perforations in the cover member and drop upon the conveyor 15 in the pan. If desired, rake members 46 can be attached to the outer parts of the sections 40 to help pull the grass rearwardly, these members 46 being desirable when the stand of hay is heavy. After the heads 45 pass off the rear of the device the springs 44 will bring the sections 41 back into alignment with the sections 40, as shown in Figure 1. The springs 44 are strong enough not only to hold the sections 41 in a straight extended position on the sections 40 but such springs should be made strong enough to cause heads 45 to bear down on the perforated pan so as to force the hay rearwardly over the pan cover, thus beating and dragging the seed loose from the hay and at the same time causing the seed to work down through the hay and then pass through the perforations in the cover. These springs 44 also act to suddenly straighten out the sections 41 as the heads leave the rear end of the perforated cover so as to force or throw the hay from off the rear end of the cover.

A chute 47 receives the seeds dropping from the buckets at the upper end of the elevator and this chute will deliver the seeds into a sack 48, shown in dotted lines, held on a platform 49 attached to the elevator casing, the platform being provided with the upright parts 50 which support a shield 51 which extends around the forward part of the chute, this shield and the holding means 52 hold the top of the bag or sack in open position with the chute extending into the same as shown in Figure 3.

From the foregoing it will be seen that the machine is simply attached to the cutter bar of the mowing machine so that it travels along with the machine and at one side thereof, the machine being supported by the wheels 10 and 12, the wheel 12 actuating the reel which includes the sectional gathering arm, and the two conveyors and the elevator. The hay or grass being pulled over the rough perforated surface of the covering member by the arms will have the seeds loosened therefrom and the seeds will drop through the perforations in the covering member upon the conveyor 15 which carries the seeds to the spiral conveyor 19 and this conveyor 19 conveys the seeds into the elevator casing where it is picked up by the buckets and carried to the chute 47 which delivers the seeds into the sack. Whenever desired the movable parts of the machine can be detached from the drive wheel by moving the clutch to releasing position.

Extension side parts 60 are fastened to the side walls and parts of the upright frames to keep the hay or grass from falling off the sides of the device and a cover member 61 is provided for the drive means at the outer side of the device. A dog 20' is located on the rear of the casing 20.

It is thought from the foregoing description that the advantages and novel features of the invention will be readily apparent.

It is to be understood that changes may be made in the construction and in the combination and arrangement of the several parts, provided that such changes fall within the scope of the appended claims.

Having described the invention, what is claimed as new is:—

1. In a device of the class described, a beater reel comprising a shaft, beater arms carried by the shaft and radiating therefrom, each arm including an inner section and an outer section pivotally connected together, at their adjacent ends, spring means for normally holding the outer section in alignment with the inner section, and rake members connected with the outer ends of the inner sections.

2. In a device of the class described, a beater reel comprising a shaft, beater arms carried by the shaft and radiating therefrom, each arm including an inner section having one end connected with the shaft and an outer section having its inner end pivoted to the outer end of the inner section, a sleeve on the outer end of each inner section having an outwardly extending projection thereon engaging the inner end of the outer section and preventing said outer section from moving forwardly from an aligned position with the inner section and permitting the outer section to move rearwardly on its pivot and spring means carried by the inner section and engaging the outer section for normally holding the outer section against said projection of the sleeve and in alignment with the inner section.

FLOYD SELLS.